(12) United States Patent
Lanier

(10) Patent No.: US 9,613,100 B2
(45) Date of Patent: Apr. 4, 2017

(54) SYSTEM AND METHOD FOR CLOUD-STORAGE SUPPORT

(71) Applicant: NETAPP, INC., Sunnyvale, CA (US)

(72) Inventor: Kyle Lanier, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 46 days.

(21) Appl. No.: 14/840,749

(22) Filed: Aug. 31, 2015

(65) Prior Publication Data

US 2017/0060961 A1  Mar. 2, 2017

(51) Int. Cl.
*G06F 17/30* (2006.01)
*G06F 11/07* (2006.01)

(52) U.S. Cl.
CPC ...... *G06F 17/30528* (2013.01); *G06F 11/079* (2013.01); *G06F 11/0727* (2013.01); *G06F 11/0751* (2013.01); *G06F 11/0772* (2013.01); *G06F 17/30477* (2013.01); *G06F 17/30554* (2013.01)

(58) Field of Classification Search
CPC ............... G06F 11/0727; G06F 11/079; H04L 41/0226; H04L 41/0213
See application file for complete search history.

(56) References Cited

U.S. PATENT DOCUMENTS

| | | | | |
|---|---|---|---|---|
| 7,206,833 | B1 * | 4/2007 | Sarangam | H04L 41/06 709/202 |
| 8,949,863 | B1 * | 2/2015 | Coatney | G06F 11/079 714/43 |
| 2014/0258525 | A1 * | 9/2014 | Yang | H04L 41/0213 709/224 |
| 2015/0074450 | A1 * | 3/2015 | Blount | G06F 11/0727 714/6.1 |
| 2016/0085606 | A1 * | 3/2016 | Panasko | G06F 11/079 714/37 |

* cited by examiner

*Primary Examiner* — Yolanda L Wilson
(74) *Attorney, Agent, or Firm* — Klein, O'Neill & Singh, LLP

(57) ABSTRACT

An OEM product label may be associated with a plurality of different OEM products; an identity of the manufacturer of the product associated with the label is determined based on the context of the product.

20 Claims, 9 Drawing Sheets

SYSTEM AND METHOD FOR CLOUD-STORAGE SUPPORT

BACKGROUND

As more and more business-critical applications are being deployed on virtualized, shared infrastructure, the number, type, and/or variety of storage devices has increased, as has the potential physical distance between storage devices belonging to the same infrastructure. A clustered storage system may include, for example, two or more cluster nodes connected in a distributed architecture such that the cluster nodes operate in a coordinated manner to respond to host requests. Each cluster node may, however, comprise different hardware, different software or firmware (or different version of the same software or firmware), and may be located physically distant from each other (in, for example, different buildings, cities, states, or countries). A need exists for a system and method for identifying and diagnosing device failures in virtualized, shared infrastructure.

BRIEF DESCRIPTION OF THE DRAWINGS

In the drawings, like reference characters generally refer to the same parts throughout the different views. In the following description, various embodiments are described with reference to the following drawings, in which.

DETAILED DESCRIPTION

Figure 1:
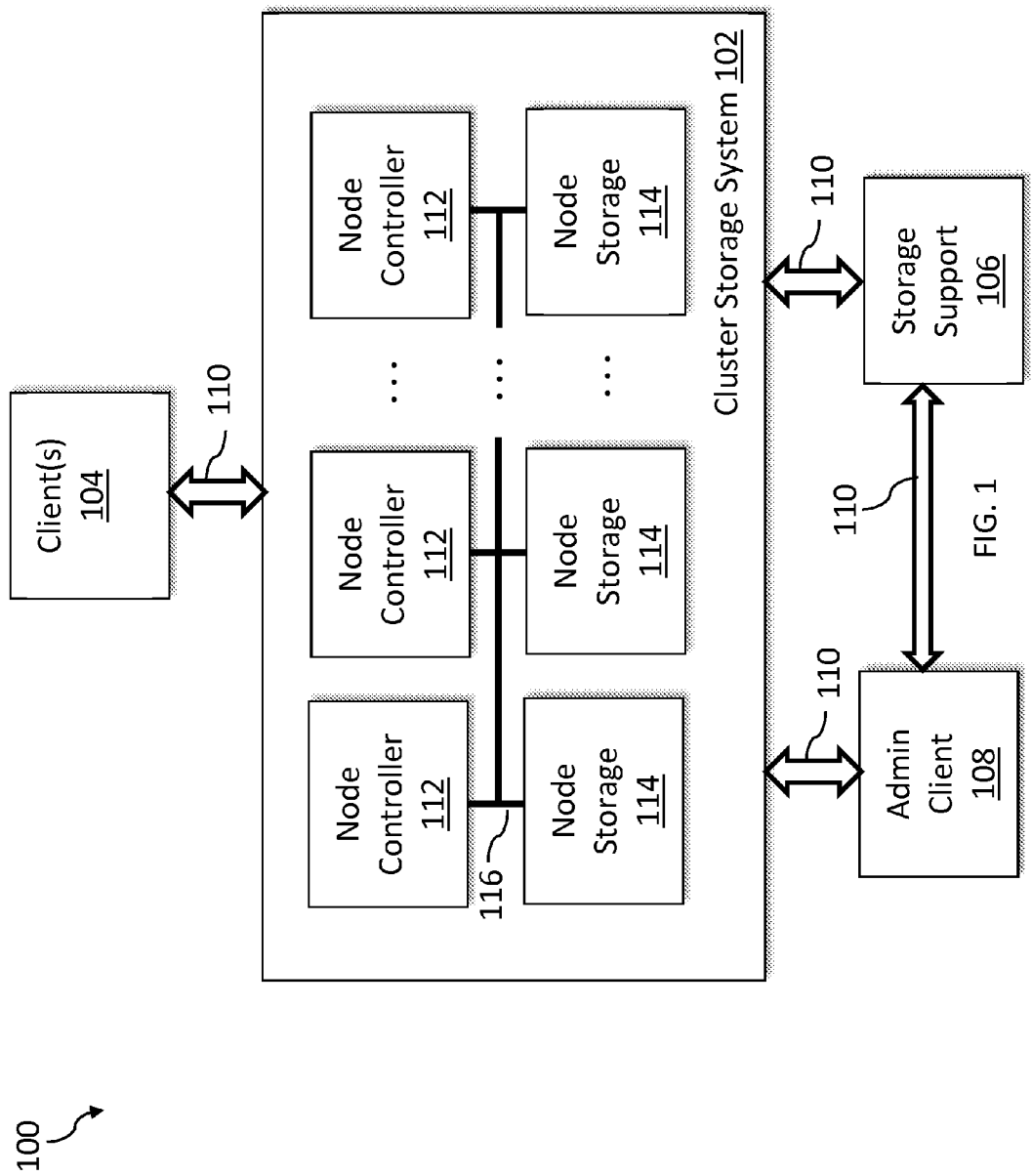
FIG. 1 illustrates one embodiment of a cluster storage system environment.

FIG. 1 illustrates a block diagram of a cluster storage environment 100. The environment may include a cluster storage system 102, one or more clients 104, a storage support system 106, and an administration client 108 communicatively and/or operatively coupled to each other via a communications network(s) 110.

The cluster storage system 102 may include one or more node controllers 112, one or more node storage devices 114, and storage/cluster interconnect 116 for communication therebetween. The node controller 112 includes computer hardware and software to execute a storage operating system such as, for example, ONTAP® from NetApp, Inc. to fulfill requests from the clients 104 to read, write, or otherwise access data stored in the storage devices 114, provide data logs to the storage support system 106, and/or provide management or administration services to the administration client 108. The node controller 112 may include a network component for sending and receiving file-level access commands from the clients 104 (using, for example, network file-sharing), a small-computer system interface ("SCSI") component for sending and receiving block-level access commands from the clients 104 (using, for example, Fibre Channel, Fibre Channel over Ethernet, or Internet SCSI protocols), and a data component for reading and writing the node storage devices 114 in response to the commands received from the clients 104.

The node storage devices 114 may include one or more data storage devices (e.g., hard disk drives, optical drives, solid-state drives, flash memory, etc.) in one or more storage virtualization groups (e.g., redundant array of independent disks ("RAID") groups, etc.). The storage virtualization groups may be further logically abstracted as various data containers such as, for example, aggregates, volumes, logical unit numbers ("LUNs"), and/or any other data structure configured to store information.

The communications network 110 may be any local- or wide-area network, such as the Internet, and may include any type of wired or wireless components. The storage/cluster interconnect 116 connects the node controllers 112 to the node storage devices 114 and/or to other node controllers 112. The storage/cluster interconnect 116 may include, for example, Ethernet cables, fiber-optic cables, or any other type of wired or wireless network connections, as well as network connectivity hardware and software such as routers or switches. The node controllers 112 and node storage devices 114 may be physically proximate each other (i.e., located in the same enclosure, server rack, room, or building) or may be physically distant from each other (i.e., located in different cities, states, or countries). Any type of network connection is within the scope of the embodiments.

The clients 104 may be any type of computing device, such as a host, server, client, workstation, desktop computer, laptop computer, tablet computer, cellular phone, or any other such computing device. The clients 104 are operatively coupled, via the communications network 110, to the cluster storage system 102 to thereby access (e.g., read, write, remove, store, retrieve, or modify) data stored on the node storage devices 112. Additionally, an administrative client 108 may communicate with the cluster storage system 102 to perform configuration and/or management functions such as, for example, security, access control, diagnostic, and/or auditing functions. In other embodiments, similar administrative functions may instead or in addition be performed by one of the clients 104.

The storage support device 106 may provide support for the cluster storage system 102 by, for example, requesting information (e.g., client support information, performance information, or diagnostic information) associated with a node controller 112 and/or node storage device 114. In some embodiments, the storage support device 106 is associated with a support-service account to thereby allow users associated with the account to request information, collection containers, notifications, and similar support services and information. In some embodiments, the storage support devices 106 are configured to generate requests for information from the cluster storage system 102 automatically, periodically, in accordance with a prior configuration, or at any other time. The requested information may include datastore information (e.g., a listing of performance containers and their associated container attribute information), transfer statistics information (e.g., information regarding the current delivery status of one or more collection containers), and/or diagnostic datastore information (e.g., a listing of diagnostic containers and their associated container attribute information).

In some embodiments, a plurality of node controllers 110 are in communication with each other and with a plurality of node storage devices 112 via the storage interconnect 114 so that when one node controller 110 in the plurality becomes communicatively inaccessible or not operational, another node controller 110 takes ownership and management of data stored in the node storage devices 112. In some embodiments, the plurality of node controllers 110 includes two node controllers 110 in communication with two node storage devices 112 to form a high-availability pair; the embodiments are not limited, however, to only pairs of node controllers 110.

Figure 2A:
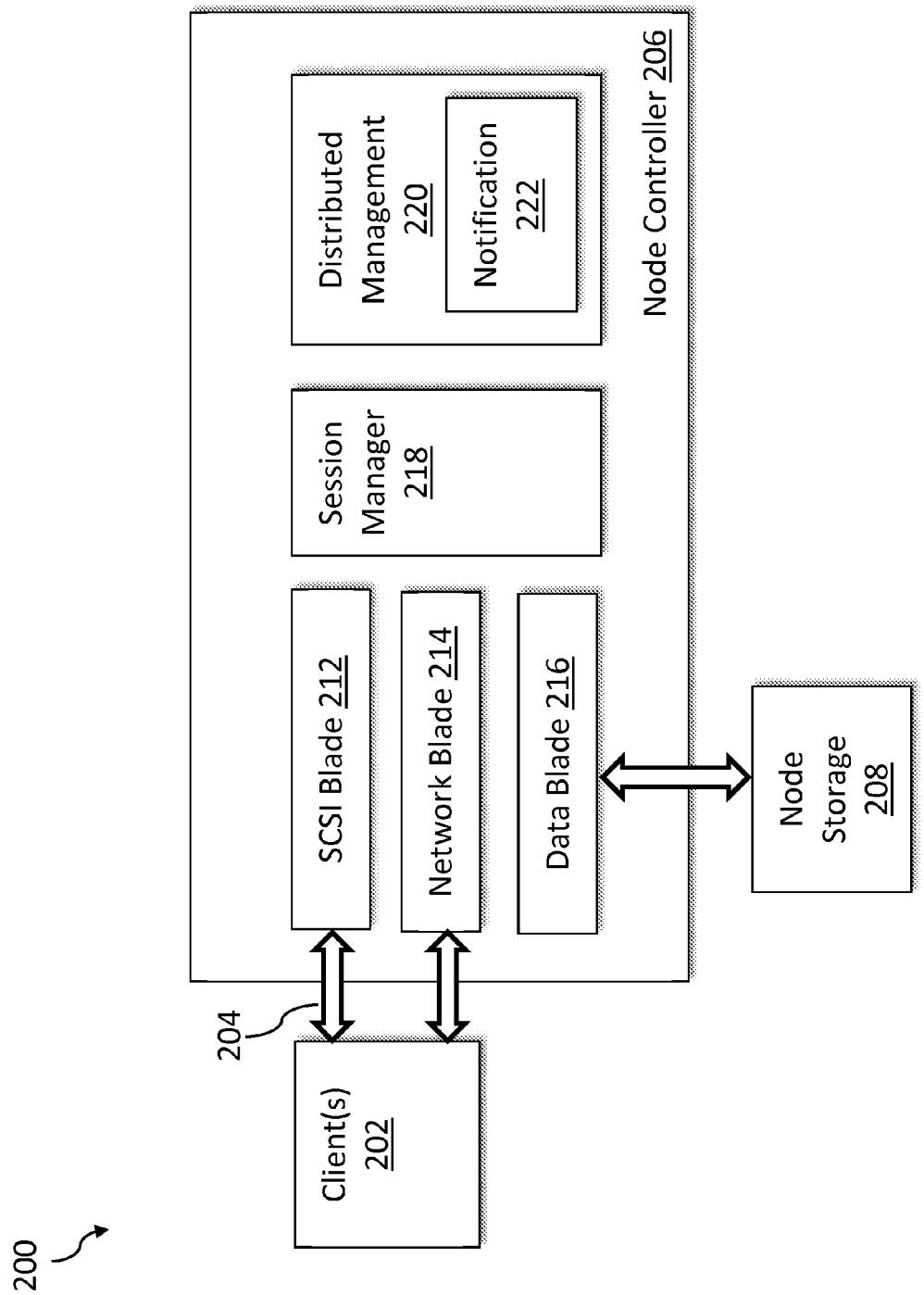
FIG. 2A illustrates one embodiment of a cluster storage system.

FIG. 2A illustrates a more detailed embodiment of a cluster storage system 200. Clients 202 communicate over a network 204 with a node controller 206 to thereby access data stored on a node storage device 208. In some embodiments, a SCSI blade 210 and/or a network blade 212 send and receive requests and data to a client 202, and a data blade 216 communicates with the node storage device 208. A session manager 218 may be used to facilitate communications between the SCSI blade 212, network blade 214, and data blade 216 using, for example, Spin Network Protocol. In some embodiments, the session manager 218 may also communicate with other cluster storage systems 200 to access data stored thereon; a client 202 connected to a first cluster storage system 200 may thereby access data on a second cluster storage system 200 without being directly connected to the second cluster storage system 200.

A distributed management component 220 may provide and update information, including configuration information, between and among a plurality of node controllers 206. The distributed management component 220 may further provide a management gateway to allow cluster administrators to perform management functions such as, for example, security, access control, diagnostic, and/or auditing functions via a client 202 (which may be an administration client). In one embodiment, a cluster administrator may be a human operator. In one embodiment, a cluster administrator may be an automated system, such as software executing on a computer system. A cluster administrator may issue commands to the distributed management component 220 that may include the commands themselves, parameters, and/or command identifiers that uniquely identify the commands. The commands may include, for example, diagnostic transfer commands for initiating the transfer of diagnostic information, performance transfer commands for initiating the transfer of performance information, transfer history commands for requesting transfer statistics information, transfer cancellation commands for cancelling a previously issued diagnostic transfer command, performance transfer commands, and/or transfer resume commands for resuming or continuing a previously cancelled performance transfer command and/or diagnostic transfer command also identified by a command identifier parameter. The distributed management component 220 may further be configured to generate one or more events that include, for example, event parameters based on the received commands and to provide responses to the received commands to a client device 202.

Figure 2B:
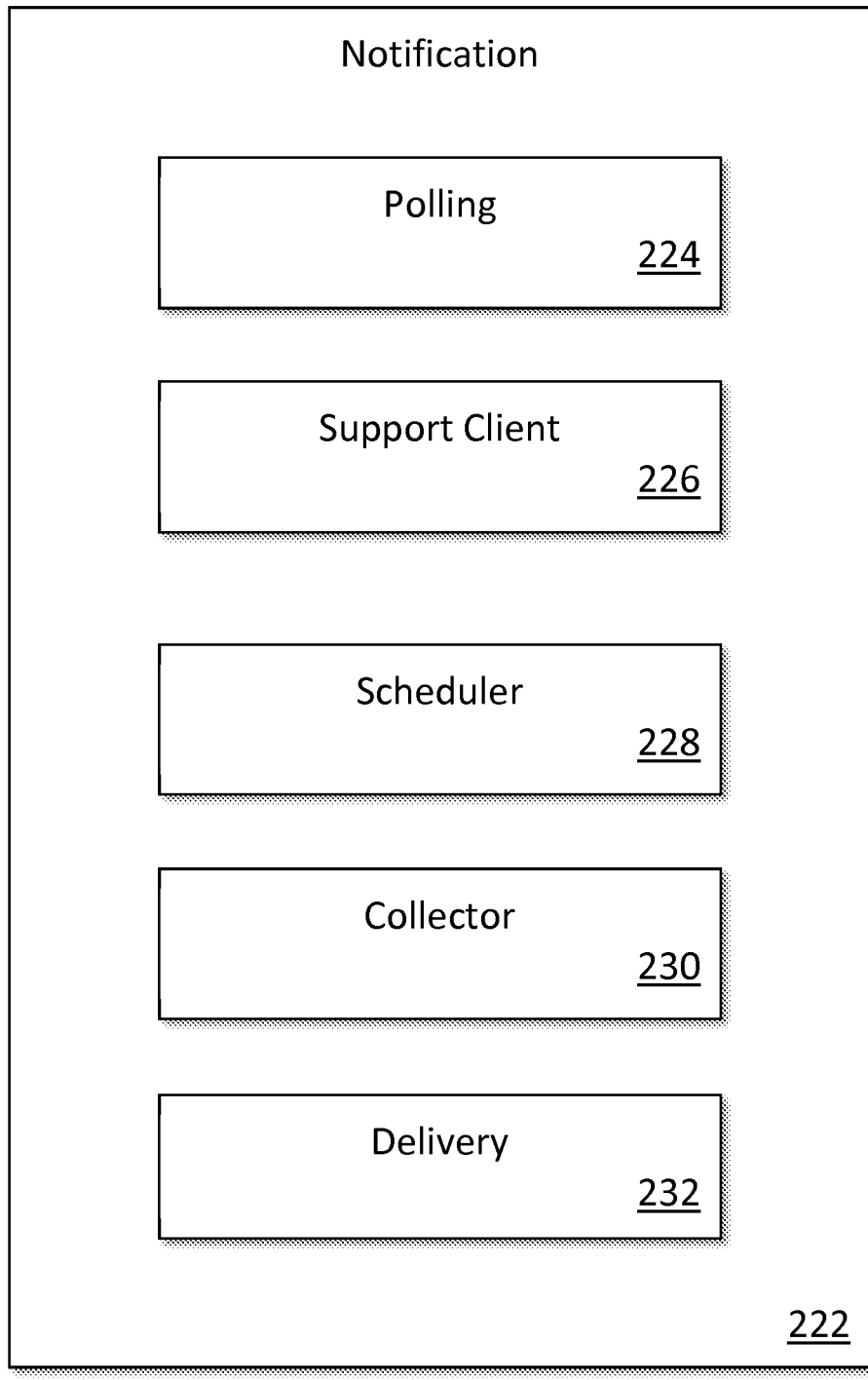
FIG. 2B illustrates one embodiment of a notification component.

The distributed management component 220 may further include a notification component 222, which may be used to manage automated support of the node controller 206. As illustrated in FIG. 2B, the notification component 222 may include, for example, a polling component 224, a support client component 226, a scheduler component 228, a collector component 230, and/or a delivery component 232. The polling component 224 may be configured to manage pending support requests for information initiated by a client device 202 by establishing a secure communications connection/channel with a storage support device (such as the storage support device 106 of FIG. 1), by issuing commands to the distributed management component 220 in accordance with a pending support request, and/or by providing responses to a pending support request to a client 202. To determine whether a pending support request has been initiated, the polling component 224 may periodically poll the support server device based on a pre-determined internal (e.g., every second, every 10 seconds, every 15 seconds, every minute, every 10 minutes, every 15 minutes, every 30 minutes, every hour, etc.). The support client 226 component may initiate automated support by generating a trigger query, receiving a query response, and/or caching the received trigger query responses. The trigger query responses may include delivery location information (such as a uniform resource identifier ("URI") or uniform resource locator ("URL")) representative of a reference path for delivering a collection container to the storage support device. The scheduler component 228 may detect events, enqueue the detected events into an event queue, dequeue events from the event queue, request the generation and/or transmission of one or more trigger queries to the storage support device, and/or request the generation and/or transmission of one or more collection containers to the storage support device. The collector component 230 may aggregate information, such as diagnostic or performance information, generated by the distributed management component 220. The delivery component 232 may deliver generated information to the storage support system; in some embodiments, the delivery component is configured to segment a collection container into container segments, determine container segment information for each container segment, and/or deliver the one or more container segments and associated container segment information to the storage support system.

Figure 3A:
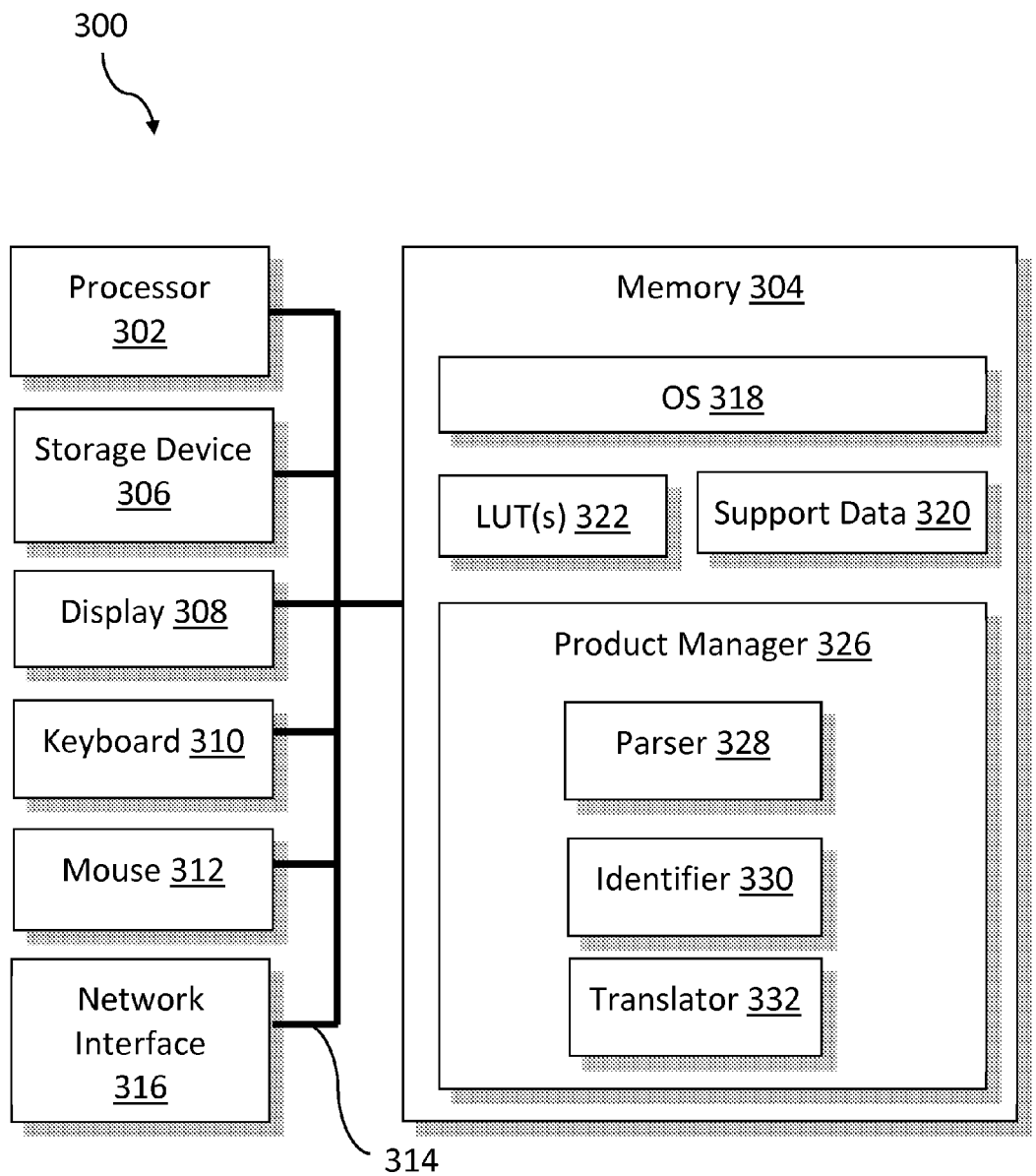
FIGS. 3A, 3B, and 3C illustrate embodiments of a client computing device.
Figure 3B:
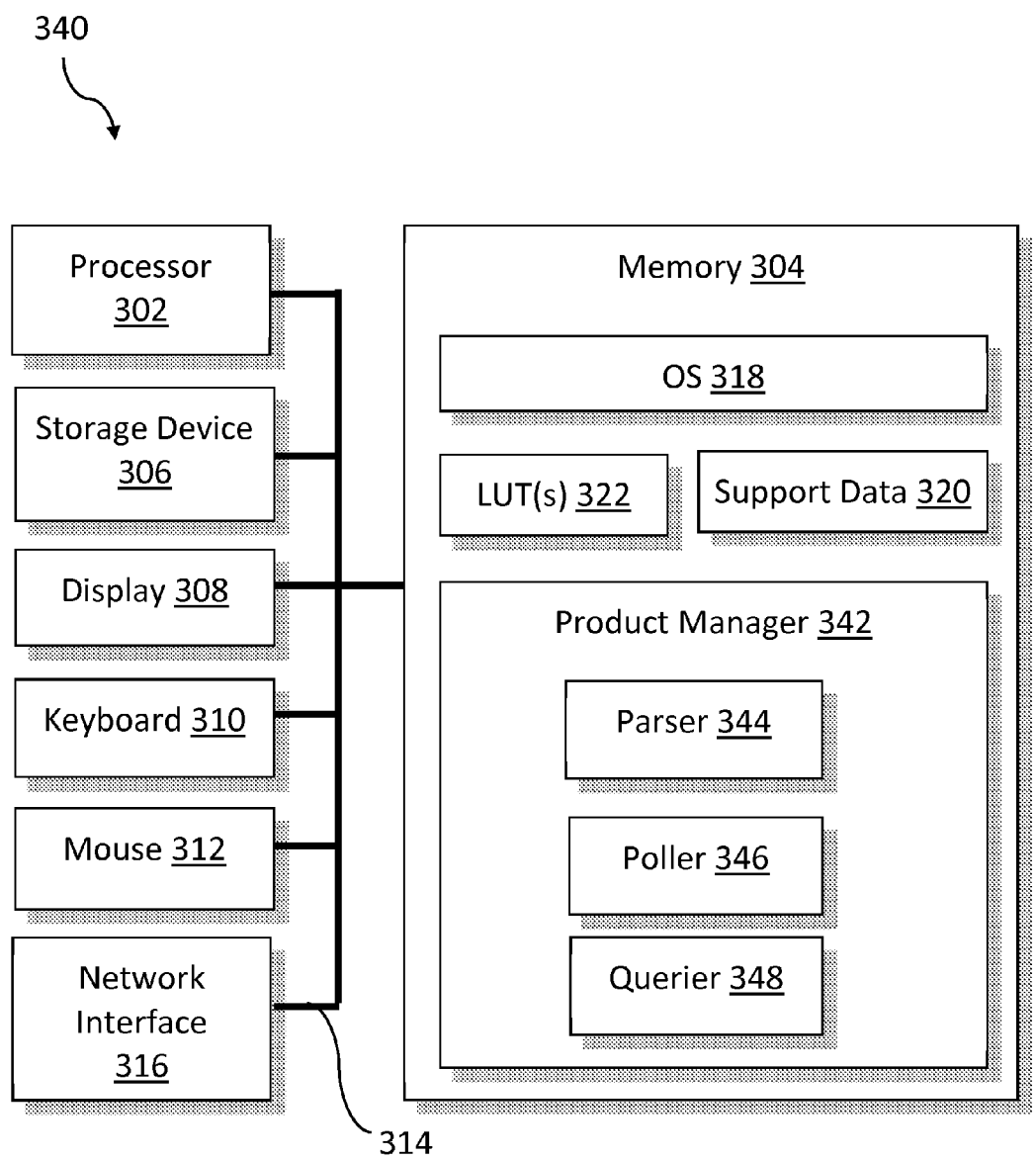
Figure 3C:
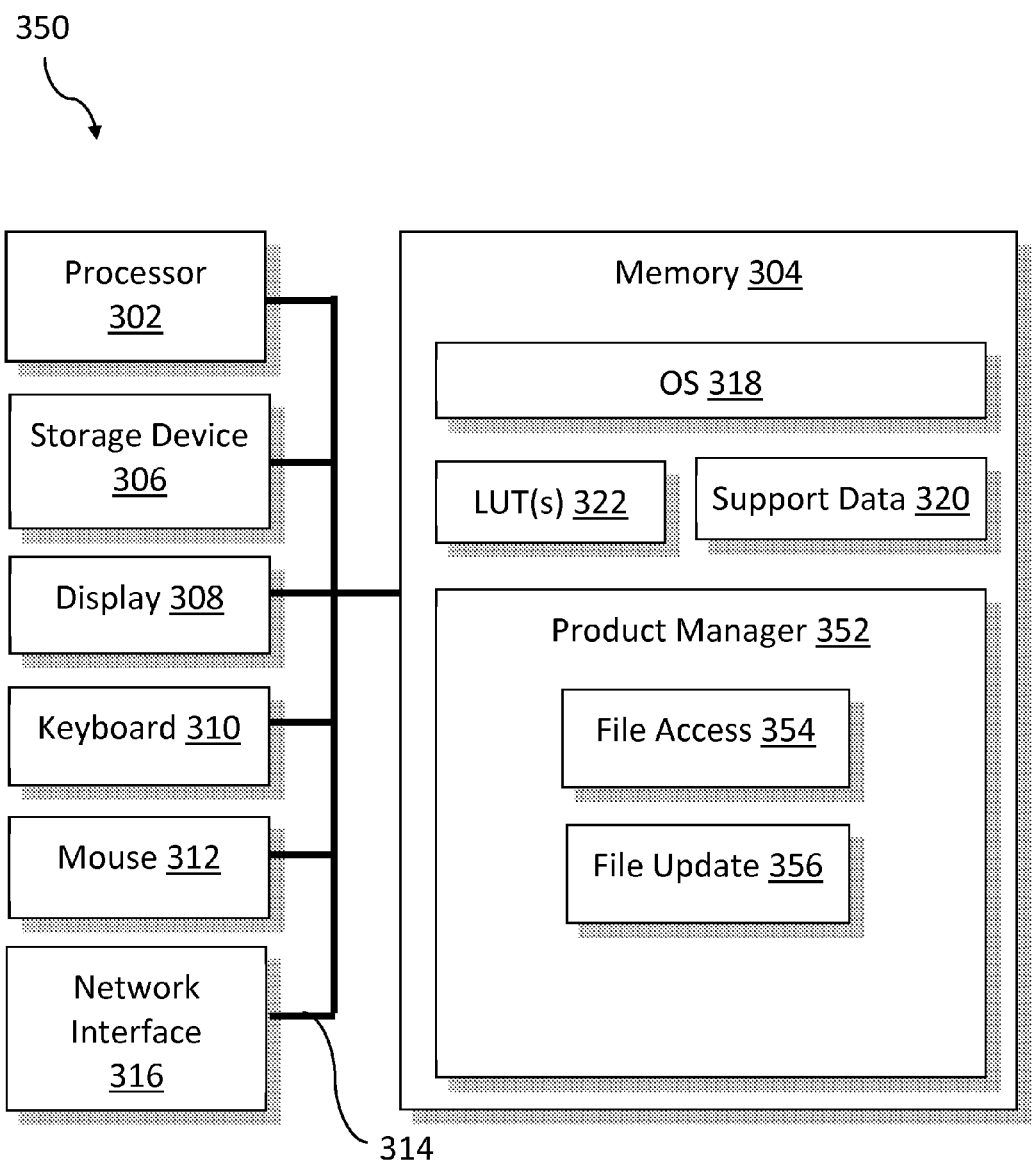

FIGS. 3A-3C are simplified block diagrams of suitably programmed general-purpose client computers 300, 340, 350 implementing the embodiments discussed herein. The computers 300, 340, 350 include a processor 302 having one or more central processing units ("CPUs"), volatile and/or non-volatile main memory 304 (e.g., random-access memory ("RAM"), read-only memory ("ROM"), or flash memory), one or more mass storage devices 306 (e.g., hard disks, or removable media such as compact discs ("CDs"), digital-video disks ("DVDs"), universal serial bus ("USB") flash drives, etc. and associated media drivers), a display device 308 (e.g., a liquid-crystal display ("LCD") monitor), user-input devices such as a keyboard 310 and a mouse 312, and one or more buses 314 (e.g., a single system bus shared between all components, or separate memory and peripheral buses) that facilitate communication between these components. A network interface 316 (e.g., a Wi-Fi or ETHERNET port) may be used to connect the computers 300, 340, 350, using the Internet or other network, to other computers or systems, such as the cluster storage system described above.

The main memory 304 may be used to store instructions to be executed by the processor 302, conceptually illustrated as a group of modules. These modules generally include an operating system 318 (e.g., a Microsoft WINDOWS, Linux, or APPLE OS X operating system) that directs the execution of low-level, basic system functions (such as memory allocation, file management, and the operation of mass storage devices), as well as higher-level software applications, such as product-manager applications 326, 342, 352, which are discussed in greater detail below. The various modules may be programmed in any suitable programming language, including, without limitation high-level languages such as C, C++, Java, Perl, Python, or Ruby or low-level assembly languages. The memory 304 may further store input and/or output data associated with execution of the instructions (including, e.g., support data 320 and look-up tables 322) as well as additional information used by the various software applications.

The computers 300, 340, 350 are described herein with reference to particular blocks, but this description is not intended to limit the embodiments to a particular physical arrangement of distinct component parts. The computers 300, 340, 350 are illustrative examples; variations and modifications are possible. Computers may be implemented in a variety of form factors, including server systems, desktop systems, laptop systems, tablets, smartphones, personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, the computer processor may be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices.

In one embodiment, with reference to FIG. 3A, the computer 300 receives support data via interface 316 that includes OEM product labels and translates, using the product manager application 326, the OEM product labels to business product labels and/or internal names, even if the manufacturer corresponding to the OEM product label is unknown, ambiguous, or overloaded. As the terms are used herein, an "OEM product label" refers to the label an original-equipment manufacturer ("OEM") has given a particular piece of hardware, firmware, software, or any other similar type of equipment or combination thereof. The OEM product label may be found by electronically querying the piece of equipment; the equipment may respond with a sequence or code that contains the OEM product label. The OEM product label may instead or in addition be found by electronically querying a related piece of equipment. The OEM product label may include any combination of letters, numbers, or other characters. A "business product label" refers to the product that includes, contains, re-brands, or otherwise uses the OEM product. One business product label may translate to only one OEM product label (if, for example, the business product simply re-brands the OEM product), or the same business product label may translate to a plurality of OEM product labels (if, for example, the business product includes more than one OEM product). An "internal name" refers to a non-public, company-only name or nickname used to refer to the business product.

Figure 4:
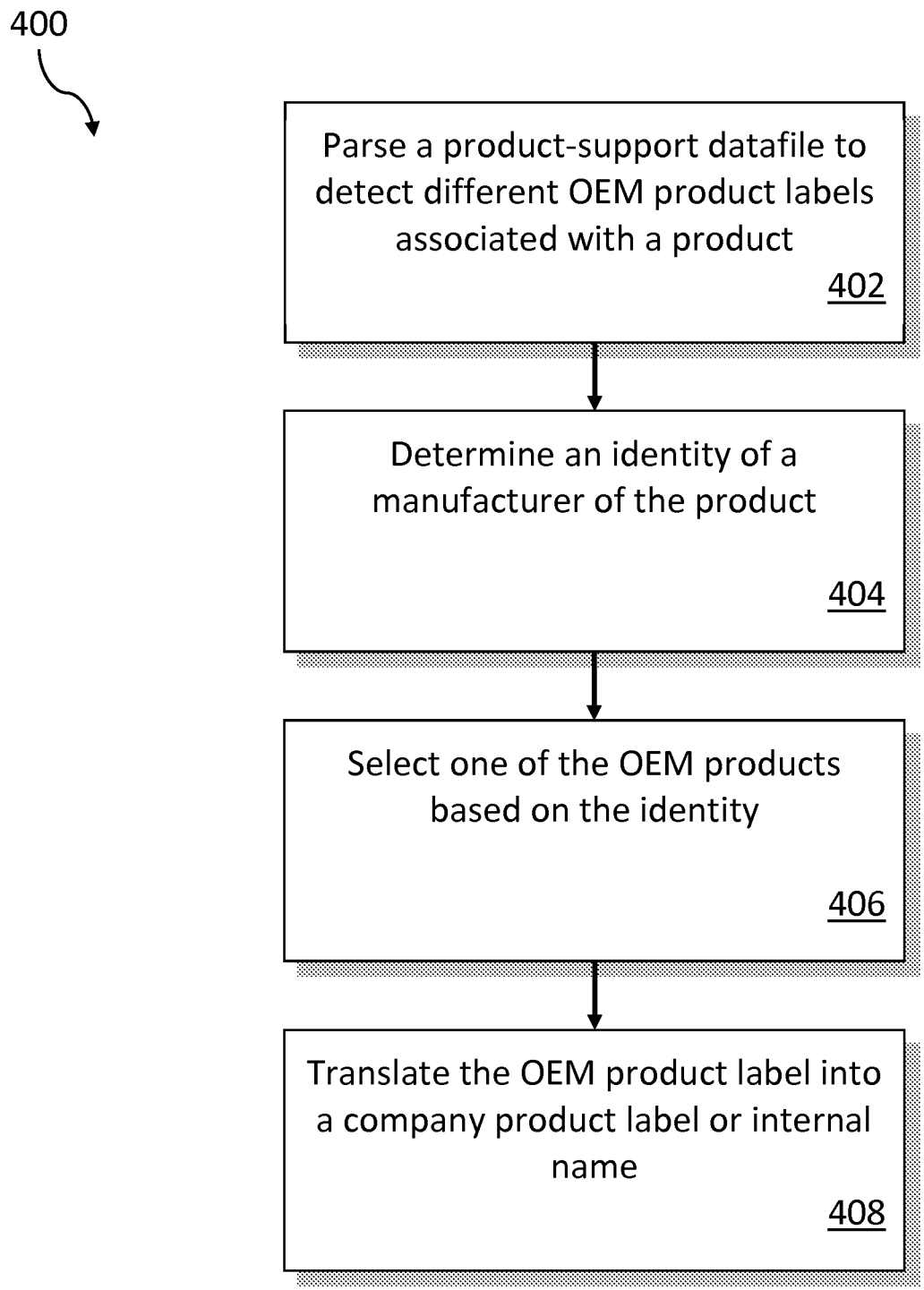
FIG. 4 illustrates one embodiment of a method for resolving OEM product labels.

FIG. 4 illustrates a flowchart 400 in accordance with an embodiment. A product-support datafile is parsed (402) using, for example, the parser 328, to detect a product having an OEM product label associated with a plurality of different OEM products. In one embodiment, this detection is performed by applying the OEM product label to a look-up table, such as look-up table 322, that maps labels to products and detecting that multiple OEM products are associated with the single OEM product label. In another embodiment, the detection is performed by applying the OEM product label to a look-up table that maps OEM labels to company labels and detecting that multiple company labels are associated with the single OEM product label.

As mentioned above, an OEM product label is typically associated with a single OEM product and hence a single company product label, and the OEM product label may be translated to a company product label or internal name via use of, for example, a look-up table (or similar structure) that maps one set of labels to another set of labels. In some cases, however, the OEM product label may be associated with a plurality of OEM products from the same or different manufacturers and hence a plurality of different company product labels. This multiple association may be the result of manufacturers coincidentally selecting the same OEM product label for different products; the selection of the same OEM product label may be more than mere chance, however, as manufacturers may be more likely to select identical OEM product labels for two different products that perform the same function, operate in the same environment, and/or operate at the same performance level. Moreover, a single manufacturer may have the same OEM product label for products that are alike in some aspects (e.g., hardware) but differ in other aspects (e.g., software or firmware version).

The product-support datafile may be generated by storage support devices (such as the storage support device 106 of FIG. 1) automatically, in response to a detected failure, by the request of a client device, or by any other means. In one embodiment, the client device 108 requests generation and sending of the product-support datafile. The product-support datafile may include HTML, XML, ASCII, binary, or any other electronic description of the status of a cluster storage system 102, may be organized hierarchically or as flat text, and may or may not be encrypted. Any format and organization of the product-support datafile is within the scope of the embodiments. One of skill in the art will understand that, while the embodiments described herein include storage devices, other embodiments may include other devices, such as, for example, power supplies, cables, fans, batteries, and/or sensors.

In order to determine which OEM product and/or company product label is associated with the OEM product label, an identity of the manufacturer is determined (404) using, for example, the identifier 330. In one embodiment, a context of the product is examined, wherein "context" refers to other OEM products in the same system, component, or unit as the OEM product of unknown origin. If, for example, a given system includes ten OEM products and nine of those ten products are associated with a single manufacturer, a tenth product having an unknown manufacturer is assigned the same manufacturer as the other nine products. In various embodiments, a product having an unknown manufacturer is assigned the manufacturer of other products in the context of the product if those other products agree on the same manufacturer for 90%, 80%, 50%, or any other percent of the other products.

Once a manufacturer has been selected, one of the original plurality of OEM products or company product labels associated with the OEM product label is selected (406) using, for example, the identifier 330. This selection may be performed by re-applying the OEM product label to the look-up table (or, in other embodiments, saving the results of the first application of the OEM product label to the look-up table and referring to the results again) and selecting one of the results matching the identity of the selected manufacturer.

Once the manufacturer and/or OEM product has been identified, the OEM product label is translated (408) using, for example, the translator 332 into a company product label and/or internal name via use of the look-up table. In various embodiments, the company product label and internal name are stored together in the same look-up table; in other embodiments, each is maintained in separate look-up tables. The look-up tables that correspond to the company product label and internal name may receive, as input, the OEM product label, the company product label (once determined), and/or the internal name (once determined). Any look-up table (or similar structure) and arrangement thereof is within the scope of the embodiments.

Once the company product label and/or internal name has been determined, one or more actions may be taken. In one embodiment, the company product label and/or internal name is used to identify a replacement product for the associated product so that the correct replacement product may be used to replace the product associated with the OEM product label in the event of its failure or malfunctioning. In some embodiments, a multi-platform HTML report is generated that includes the company product label and/or internal name (or any other information disclosed herein); this multi-platform report may be read or viewed on any computing platform.

In some embodiments, as mentioned above, the physical location of a failed or failing storage device is difficult to determine. For example, with reference again to FIG. 1, one or more node storage units 114 may include logical storage volumes that include a plurality of redundant or partially redundant physical disks for purposes of reliability, error-checking, speed, and/or cost. Node storage unit(s) 114 may include, for example, a first physical disk located in a first city and a second physical disk located in a second city that store the same information; clients 104 that access the node storage unit may not know (or care to know) which of the two physical disks they are actually accessing. Redundant disks such as the pair just described (and, as one of skill in the art will understand, many other types and classes of disk redundancy, such as RAID) may provide increased reliability (if, for example, one disk fails, the other remains to provide data to clients) and/or increased speed (a client physically closer to one physical disk may have better performance if its requests are routed to the closer disk).

Figure 5:
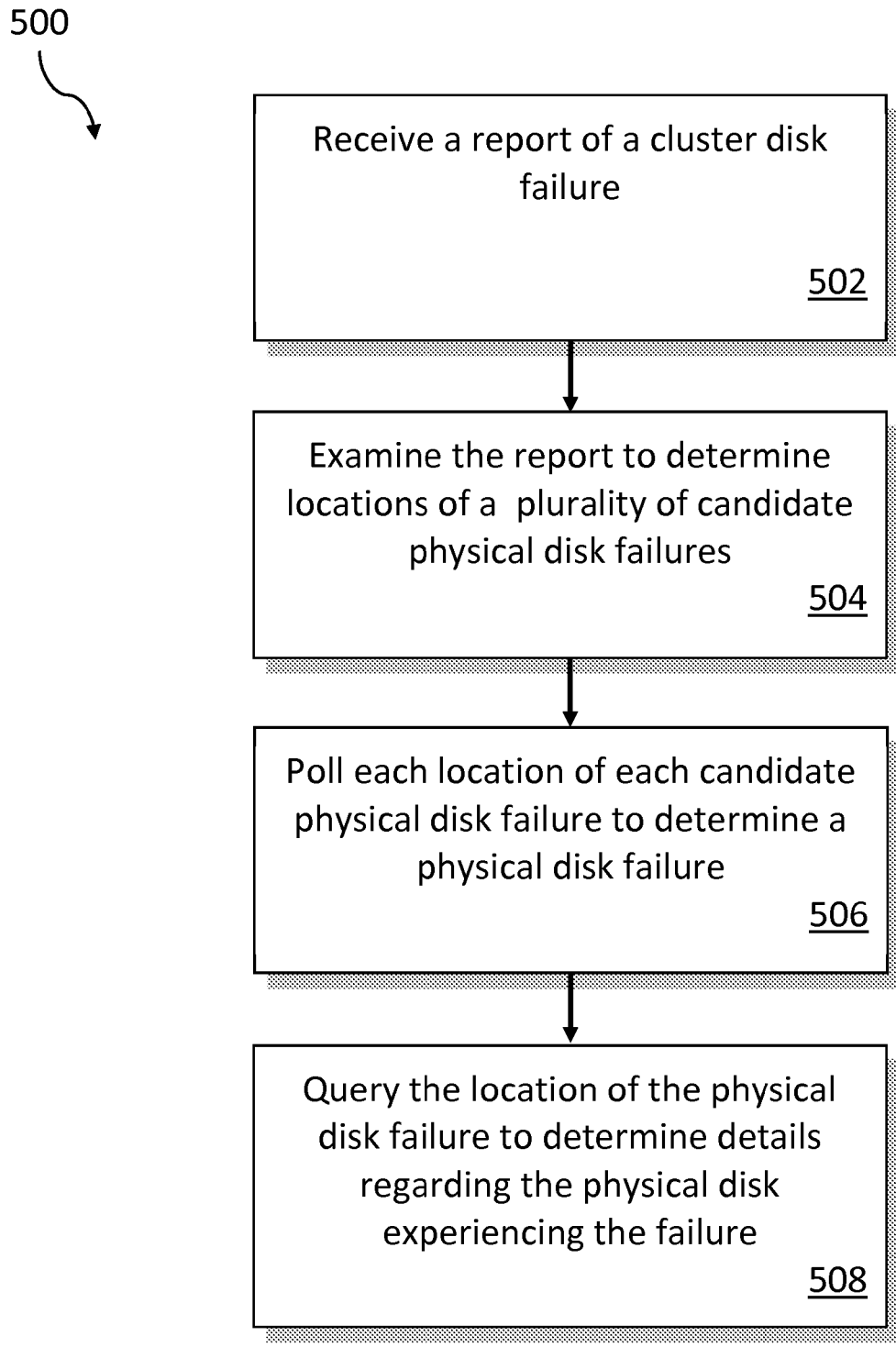
FIG. 5 illustrates one embodiment of a method for determining physical device failures.

FIG. 5 illustrates a method 500 for identifying a location of a physical disk failure. With reference also to FIG. 3B, a report is received (502) via, for example, the interface 316, that includes information regarding a cluster disk failure but, as explained above, this information may not include a location of the actual failure on the physical disk. In some embodiments, a plurality of reports are received from a plurality of clusters that minor or otherwise duplicate data across physical disks; the disks may be located in the same physical location or in separate locations. For example, if cluster A is in California and cluster B is in New York, and if cluster A further mirrors cluster B in California and cluster B further minors cluster A in New York, a diagnostic client (such as admin client 108 or storage support device 106 of FIG. 1) may receive redundant reports from both cluster A and cluster B that a disk has failed. In other embodiments, a single disk failure may generate redundant failure notices from a single report if a storage node uses multiple channels (i.e., cables) to access a disk having a failure. These reports, therefore, may not specify which copy of the disk in cluster A has failed—the California copy or the New York copy—and may not uniquely identify the disk within a cluster. Thus, the report is examined (504) using, for example, the parser 344 to determine the locations of a plurality of candidate physical disk failures. The examination may include parsing the report to determine the channel, shelf, bay, name, number, network address, physical address, MAC address, associated client(s), or other such information regarding the candidate physical disk failures. In one embodiment, the report has a specific file name (e.g., "sysconfig-r.txt") and the file associated with this filename is examined. This file (or information therein) may be included in the report and/or retrieved separately by the admin client 108 from the one or more clusters. In some embodiments, some types of storage systems are capable of supporting multi-location disks while others are not; the report may be parsed to determine a system type and whether multi-location disks are supported.

Once the locations of the candidate physical disk failures are determined, each location is polled (506) using, for example, the poller 346 to determine further details of the physical disk failure. In one embodiment, the storage system at each location includes a file (named, e.g., "sysconfig-a.txt"), and a client such as the administration client 108 communicates with the storage system to download or parse this file. This or a similar file or files may contain information regarding the existence of a physical failure at that particular system and further information regarding, e.g., the nature of the failure, the serial number, OEM product label, or company product label associated with the failing device, or any other such information. In various embodiments, the poller 346 polls all of the candidate physical disks; in another embodiment, the poller 346 stops once a physical error is found. The location of the physical disk failure may be queried (508) using, for example, the querier 348 to determine details regarding the physical disk experiencing the failure. The steps 502-508 may be performed instead of, or in addition to, the steps 402-408 of FIG. 4.

As mentioned above, in other embodiments, the client device (such as administration client 108) may be authenticated or authorized before any of the above-referenced steps are carried out. In some embodiments, the client 108 is a workstation or desktop computer and is hard-wired into a local network 110 such that communication with the cluster storage system 102 is already authorized or authenticated. In other embodiments, however, the client 108 is a laptop or other mobile device, and the application programs are loaded to the memory 304 from a portable source, such as a flash drive. In these embodiments, the client 108 may not already be authenticated; if, for example, the flash drive were stolen, an unauthorized or unauthenticated client might be able to access the cluster storage system 102.

Figure 6:
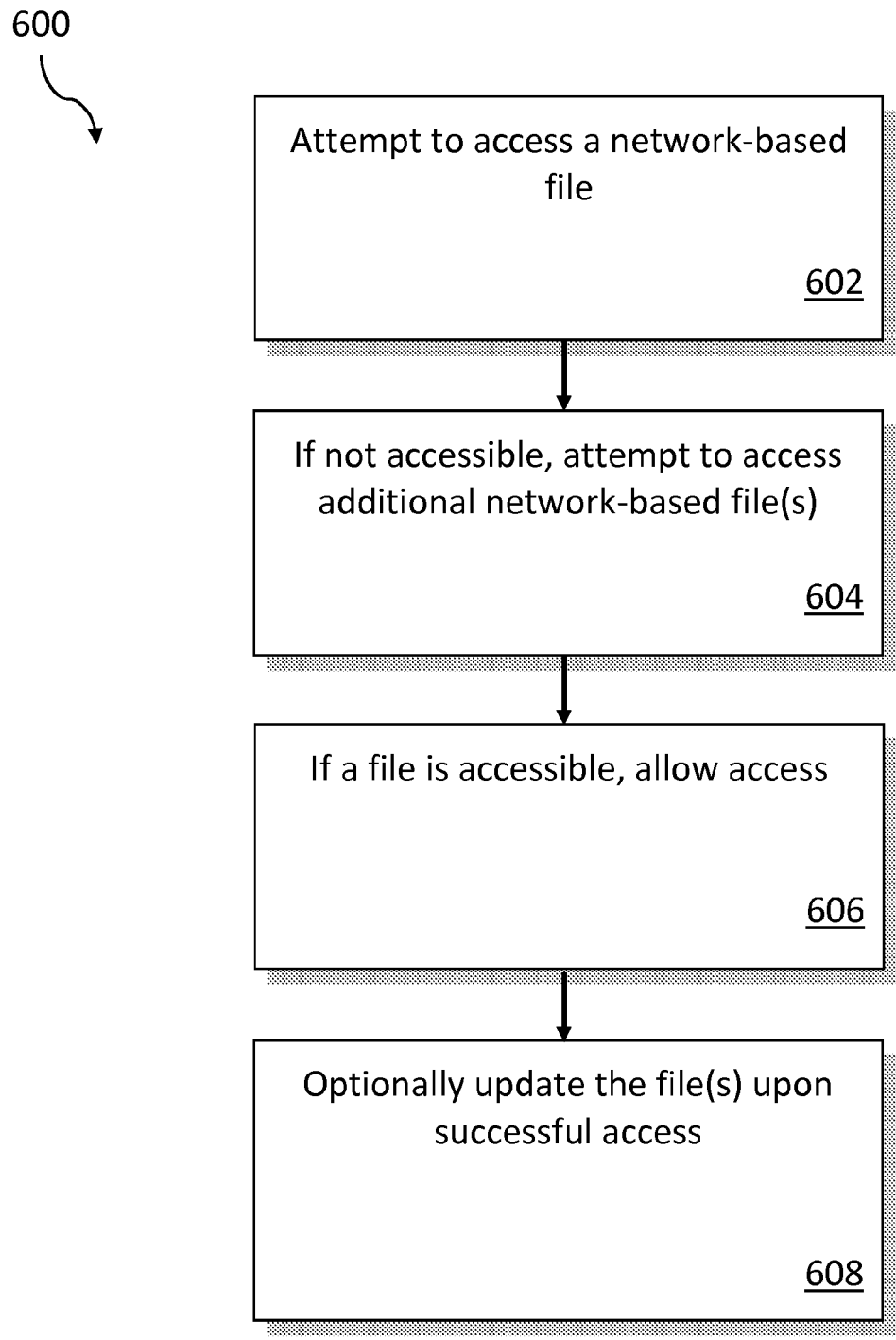
FIG. 6 illustrates one embodiment of a method for providing secure access.

Thus, in one embodiment and with reference to FIG. 6 and FIG. 3C, the client device 108 attempts (602) to access one or more network-based files using, for example, the file access component 354 prior to allowing the user any access to, e.g., the cluster storage system 102. The network-based files exist on one or more remote servers and may be accessing using any network-file protocol, such as CIFS or NFS. In one embodiment, however, the client 108 has already authenticated or authorized itself to the one or more remote servers in order to have the network-based files accessible. This authentication or authorization may be, for example, the provision of a username and password to an NFS or similar server.

The first network-based file for which access is attempted may be any file in a list of known network-based files; in some embodiments, the first file accessed may be one residing on a server that is closest to the client 108 (in terms of physical and/or network distance), a server that has a currently lightest load, or a server that provides the most network bandwidth to the client 108. If the first file is not accessible to the client 108, the client 108 may report an authentication error or may attempt (604) to access additional files in the list of known network-based files. If one or more network-based files are accessible, the client 108 allows access.

Once a file is successfully accessed, the client 108 may optionally update the file by changing its filename and/or contents using, for example, the file update component 356. For example, after authentication/authorization, if access is allowed, the file update component 356 may attempt to access a network-based file (called, for example, critical_update_key); if the attempt is unsuccessful, the file update component 356 may download a new version of the file-access program and deny the existing version of the parser from parsing. These steps may be carried out if, for example, a replacement product ID mapping table has been updated to include replacement products that have reached end of service and are thus no longer supported. If the file update component 356 is able to access the file critical_update_key successfully, however, the file update component 356 may attempt to access another network-based file (named, for example, standard_update_key); if unsuccessful, the file update component 356 may inform the user an update is available, download the new version of the program for the file update component 356, and allow the existing version of the file update component 356 to continue. After authentication/authorization has been established and the current version of the file update component 356 has been allowed to continue, the file update component 356 may access the network-based file to update the number of times the file update component 356 has been used by the user.

In various embodiments, a method includes parsing, using a computer processor, a product-support datafile stored in a computer memory to detect a product having an original-equipment manufacturer (OEM) product label associated with a plurality of different OEM products. An identity of a manufacturer of the product is determined, using the computer processor, based at least in part on a context of the product. One of the plurality of OEM products is selected, using the computer processor, based on the determined identity of the manufacturer. The OEM product label is translated, using the computer processor, into a company product label or an internal name based on the selected OEM product.

The context of the product may include other products associated with the product. The other products associated with the product may be present in the same system, cluster, or module as the product. Determining the identity of the manufacturer may include determining the manufacturer of other products associated with the product. The manufacturer may have manufactured 50%, 75%, or 90% of the other products associated with the product.

The method may further include receiving a report of a cluster disk failure, examining the report to determine locations of a plurality of candidate physical disk failures associated with the cluster disk failure, polling each location of each candidate physical disk failure to determine a physical disk failure, and querying the location of the physical disk failure to determine details regarding the physical disk experiencing the failure. The method may further include, prior to parsing the product-support datafile, attempting to access a network-based file, if the network-based file is not accessible, attempting to access additional network-based files, and if at least one network-based file is accessible to the system, allowing parsing of the product-support datafile and, in other embodiments, updating at least one network-based file upon successful access thereof.

In some embodiments, a non-transitory machine-readable medium having stored thereon instructions for performing a method comprising machine-executable code which when executed by at least one machine, causes the machine to parse a product-support datafile stored in a computer memory to detect a product having an original equipment manufacturer (OEM) product label associated with a plurality of different OEM products, determine, using a computer processor, an identity of a manufacturer of the product based at least in part on a context of the product, select, using a computer processor, one of the plurality of OEM products based on the determined identity of the manufacturer, and translate, using a computer processor, the OEM product label into a company product label or an internal name based on the selected OEM product.

The context of the product may include other products associated with the product. The other products associated with the product may be present in the same system, cluster, or module as the product. The instructions that determine the identity of the manufacturer may include determining the manufacturer of other products associated with the product. The manufacturer may have manufactured 50%, 75%, or 90% of the other products associated with the product.

The instructions may further cause the machine to receive a report of a cluster disk failure, examine the report to determine locations of a plurality of candidate physical disk failures associated with the cluster disk failure, poll each location of each candidate physical disk failure to determine a physical disk failure, and query the location of the physical disk failure to determine details regarding the physical disk experiencing the failure. The instructions may further cause the machine to prior to parsing the product-support datafile, attempt to access a network-based file, if the network-based file is not accessible, attempt to access additional network-based file, and if at least one network-based file is accessible to the system, allow parsing of the product-support datafile. The instructions may further enable the system to update at least one network-based file upon successful access thereof.

In some embodiments, a computing device includes a memory containing machine-readable medium comprising machine-executable code having stored thereon instructions for performing a method of identifying OEM product labels in computing systems; and a processor coupled to the memory, the processor configured to execute the machine-executable code to cause the processor to parse a product-support datafile received from a cluster to detect a product having an OEM product label associated with a plurality of different OEM products, determine an identity of a manufacturer of the product based at least in part on a context of the product, select one of the plurality of OEM products based on the determined identity of the manufacturer, and translate the OEM product label into a company product label or an internal name based on the selected OEM product.

The computer processor may be further configured to receive a report of a cluster disk failure, examine the report to determine locations of a plurality of candidate physical disk failures associated with the cluster disk failure, poll each location of each candidate physical disk failure to determine a physical disk failure, query the location of the physical disk failure to determine details regarding the physical disk experiencing the failure.

The computer processor may be further configured to, prior to parsing the product-support datafile, attempt to access a network-based file, if the network-based file is not accessible, attempt to access additional network-based files, if at least one network-based file is accessible to the system, allow parsing of the product-support datafile. The computer processor may be further configured to update at least one network-based file upon successful access.

It should also be noted that embodiments may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments were described above. It is, however, expressly noted that the embodiments are not limited to those embodiments, but rather the intention is that additions and modifications to what was expressly described herein are also included within the scope of the embodiments. Moreover, it is to be understood that the features of the various embodiments described herein were not mutually exclusive and can exist in various combinations and permutations, even if such combinations or permutations were not made express herein, without departing from the spirit and scope of the embodiments. In fact, variations, modifications, and other implementations of what was described herein will occur to those of ordinary skill in the art without departing from the spirit and the scope of the embodiments. As such, the embodiments are not to be defined only by the preceding illustrative description.

What is claimed is:

1. A method comprising:
  parsing, using a computer processor, a product-support datafile stored in a computer memory to detect a product having an original-equipment manufacturer (OEM) product label associated with a plurality of different OEM products; wherein prior to parsing the product-support datafile, attempting to access a network-based file; if the network-based file is not accessible, attempting to access additional network-based files; and if at least one network-based file is accessible to the system, allowing parsing of the product-support datafile;
  determining, using the computer processor, an identity of a manufacturer of the product based at least in part on a context of the product;
  selecting, using the computer processor, one of the plurality of OEM products based on the determined identity of the manufacturer; and
  translating, using the computer processor, the OEM product label into a company product label or an internal name based on the selected OEM product.

2. The method of claim 1, wherein the context of the product comprises other products associated with the product.

3. The method of claim 2, wherein the other products associated with the product are present in the same system, cluster, or module as the product.

4. The method of claim 1, wherein determining the identity of the manufacturer comprises determining the manufacturer of other products associated with the product.

5. The method of claim 4, wherein the manufacturer manufactured 50%, 75%, or 90% of the other products associated with the product.

6. The method of claim 1, further comprising:
  receiving a report of a cluster disk failure;
  examining the report to determine locations of a plurality of candidate physical disk failures associated with the cluster disk failure;
  polling each location of each candidate physical disk failure to determine a physical disk failure; and
  querying the location of the physical disk failure to determine details regarding the physical disk experiencing the failure.

7. The method of claim 1, further comprising updating at least one network-based file upon successful access thereof.

8. A non-transitory machine-readable medium having stored thereon instructions for performing a method comprising machine-executable code which when executed by at least one machine, causes the machine to:
  parse a product-support datafile stored in a computer memory to detect a product having an original equipment manufacturer (OEM) product label associated with a plurality of different OEM products; wherein prior to parsing the product-support datafile, attempt to access a network-based file; if the network-based file is not accessible, attempt to access additional network-based files; and if at least one network-based file is accessible to the system, allow parsing of the product-support datafile;
  determine an identity of a manufacturer of the product based at least in part on a context of the product;
  select one of the plurality of OEM products based on the determined identity of the manufacturer; and
  translate the OEM product label into a company product label or an internal name based on the selected OEM product.

9. The machine-readable medium of claim 8, wherein the context of the product comprises other products associated with the product.

10. The machine-readable medium of claim 9, wherein the other products associated with the product are present in the same system, cluster, or module as the product.

11. The machine-readable medium of claim 8, wherein the instructions that determine the identity of the manufacturer comprise determining the manufacturer of other products associated with the product.

12. The machine-readable medium of claim 11, wherein the manufacturer manufactured 50%, 75%, or 90% of the other products associated with the product.

13. The machine-readable medium of claim 8, wherein the instructions further cause the machine to:
  receive a report of a cluster disk failure;
  examine the report to determine locations of a plurality of candidate physical disk failures associated with the cluster disk failure;
  poll each location of each candidate physical disk failure to determine a physical disk failure; and
  query the location of the physical disk failure to determine details regarding the physical disk experiencing the failure.

14. The machine-readable medium of claim 8, wherein the instructions further enable the system to update at least one network-based file upon successful access thereof.

15. A computing device comprising:
  a memory containing machine-readable medium comprising machine-executable code having stored thereon instructions for performing a method of identifying OEM product labels in computing systems; and a processor coupled to the memory, the processor configured to execute the machine-executable code to cause the processor to:
  i. parse a product-support datafile received from a cluster to detect a product having an OEM product label associated with a plurality of different OEM products; wherein prior to parsing the product-support datafile, attempt to access a network-based file; if the network-based file is not accessible, attempt to access additional network-based files; and if at least one network-based file is accessible to the system, allow parsing of the product-support datafile;
  ii. determine an identity of a manufacturer of the product based at least in part on a context of the product;
  iii. select one of the plurality of OEM products based on the determined identity of the manufacturer; and
  iv. translate the OEM product label into a company product label or an internal name based on the selected OEM product.

16. The computing device of claim 15, wherein the computer processor is further configured to:
receive a report of a cluster disk failure;
examine the report to determine locations of a plurality of candidate physical disk failures associated with the cluster disk failure;
poll each location of each candidate physical disk failure to determine a physical disk failure; and
query the location of the physical disk failure to determine details regarding the physical disk experiencing the failure.

17. The computing device of claim 15, wherein the computer processor is further configured to update at least one network-based file upon successful access.

18. The computing device of claim 15, wherein the context of the product comprises other products associated with the product.

19. The computing device of claim 18, wherein the other products associated with the product are present in the same system, cluster, or module as the product.

20. The computing device of claim 15, wherein the machine executable code further causes the machine to determine the manufacturer of other products associated with the product.

* * * * *